US008066785B2

(12) United States Patent
Gonchar et al.

(10) Patent No.: US 8,066,785 B2
(45) Date of Patent: *Nov. 29, 2011

(54) PROCESS FOR RECYCLING WASTE MATERIALS

(75) Inventors: Howard Gonchar, Kingston, PA (US);
Roman Bielski, Coopersburg, PA (US);
Donald Keiper, Wilkes-Barre, PA (US);
Ken Battle, Shamong, NJ (US)

(73) Assignee: Recarbon Corp., Kingston, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/916,575

(22) Filed: Oct. 31, 2010

(65) Prior Publication Data
US 2011/0041391 A1 Feb. 24, 2011

Related U.S. Application Data

(63) Continuation-in-part of application No. 12/179,383, filed on Jul. 24, 2008, now Pat. No. 7,846,225, which is a continuation-in-part of application No. 11/830,681, filed on Jul. 30, 2007, now Pat. No. 7,842,106.

(51) Int. Cl.
*C10L 5/00* (2006.01)
(52) U.S. Cl. .............................. 44/605; 44/628; 521/40
(58) Field of Classification Search .................. 44/605, 44/628; 521/40
See application file for complete search history.

(56) References Cited

U.S. PATENT DOCUMENTS

| | | | | |
|---|---|---|---|---|
| 3,725,314 | A | * | 4/1973 | Pelofsky ...................... 521/44.5 |
| 3,996,022 | A | | 12/1976 | Larsen |
| 5,230,777 | A | | 7/1993 | Jarrell |
| 5,304,576 | A | | 4/1994 | Martinez |
| 5,389,691 | A | | 2/1995 | Cha et al. |
| 5,618,852 | A | | 4/1997 | Adkins |
| 5,821,396 | A | | 10/1998 | Bouziane |
| 5,905,095 | A | | 5/1999 | Adkins |
| 6,066,685 | A | | 5/2000 | Nobusawa et al. |
| 6,329,436 | B1 | | 12/2001 | Jody et al. |
| 6,736,940 | B2 | | 5/2004 | Masemore et al. |
| 6,802,897 | B1 | | 10/2004 | Lackey et al. |

FOREIGN PATENT DOCUMENTS

| | | |
|---|---|---|
| KR | 10-0148205 | 8/1998 |
| KR | 10-2005-0076204 | 6/2005 |
| KR | 10-2007-0010867 | 1/2007 |

OTHER PUBLICATIONS

Rios M. Gontijo, V.P. Ferraz, R.M. Lago, and M. H. Araujo, J. Braz. Chem. Soc., 17, 2006 doi: 10.1590/so 103-50532006000300027.
Mastral et al., Assesment of the Tire Role in Coal-Tire Hydrocoprocessing, Energy & Fuels 1997, 11,676-680.
Sugano et al., Additive Effect of Waste Tire on the Hydrogenolysis Reaction of Coal Liquefaction Residue, Energy & Fuels 2006, 20, 2713-2716.
Cunliffe et al., Influence of Process Conditions on the Rate of Activation of Chars Derived from Pyrolysis of Used Tires, Energy & Fuels 1999,13,166-175.
Hope, Mark, Specification Guidelines for Tire Derived Fuel.
Osmont, et al., Thermochemistry of C-C and C-H Bond Breaking in Fatty Acid Methy Esters, American Chemical D Society Web Publication, Jun. 15, 2007.
Giray et al., Supercritical extraction of scrap tire with different solvents and the effect of tire oil on the supercritical extraction of coal, Fuel Processing Technology 85 (2004) 251-265.
Piskorz et al., Recovery of Carbon Black from Scrap Rubber, Energy & Fuels, 1999, 13, 544-551.
Urban Bus Operation, Life Cycle Inventory of Biodiesel and Petroleum Diesel, 171 NRELISR-580-24089.
Singh, et al., Base-Catalyzed Fast Transesterification of Soybean Oil Using Ultrasonication, Energy & Fuels 2007,21, 1161-1164.
Barnard, et al., Continuous Flow Preparation of Biodiesel Using Microwave Heating, Energy & Fuels 2007, 1777-1781.
Hribernik, et al., Influence of Biodiesel Fuel on the Combustion and Emission Formation in a Direct Injdection (DI) Diesel Engine, Energy & Fuels 2007,21, 1760-1767.
Park, et al., Depolymerization of Styrene-Butadiene Copolymer in Near-Critical and Supercritical Water, Ind. Eng. Chem Res. 2001,40, 756-767.
Unapumnuk, et al., Carbon Distribution from the Pyrolysis of Tire-Derived Fuels, Ind. Eng. Chem. Res. 2006, 45, 8757-8764.
Murillo, et al., Production and Application of Activated Carbons Made from Waste Tire, Ind. Eng. Chem. Res. 2005, 44,7228-7233.
Kovuttikulrangsie, et al., The molecular weight (MW) and molecular weight distribution (MWD) of NR from different age and clone Hevea trees, J. Sci. Technol., 2005,27(2):337-342.

* cited by examiner

*Primary Examiner* — Cephia D Toomer
(74) *Attorney, Agent, or Firm* — Mitchell A. Smolow

(57) ABSTRACT

The present invention provides a process which utilizes biodiesel and other high boiling esters containing short alkyl groups to produce liquid fuels from waste material. The waste material is added to a solvent having a predetermined cycle starting solvent volume. An energy source is introduced into the solvent for a predetermined time at a predetermined temperature and pressure to form a non-grindable product. The energy source is removed and the product is cooled to a predetermined temperature to produce the fuel. The invention also encompasses the fuel formed by the process described.

27 Claims, No Drawings

PROCESS FOR RECYCLING WASTE MATERIALS

CROSS REFERENCE TO RELATED APPLICATIONS

This application is a continuation in part and claims benefit of U.S. application Ser. No. 11/830,681 filed Jul. 30, 2007, now U.S. Pat. No. 7,842,106; and U.S. application Ser. No. 12/179,383 filed Jul. 24, 2008, now U.S. Pat. No. 7,846,225.

FIELD OF THE INVENTION

This invention relates to a process for transforming various waste materials into fuels.

BACKGROUND OF THE INVENTION

The accumulation of waste materials has become a significant societal problem. Such waste materials include, for example, non-organic matter, organic matter, and polymeric materials having extremely low or zero degradation rates. For example, the number of tires produced and disposed of in the United States is estimated to be about 300 million annually. Additionally, fluff produced by, for example, recycled motor vehicles and appliances is estimated to be 500 pounds of fluff for each ton of recovered steel.

The uses for waste tires are rather limited. While they have been added to asphalt, burned in kilns, used as shock absorbers in playgrounds, and used as absorbers of oil spills, the vast majority of waste tires remain as a problematic environmental and health concern.

Natural rubber is a polymer deriving from isoprene (2-methyl-1,3-butadiene). The molecular weight of the natural rubber varies significantly and is between $10^4$ and $10^6$. The Merck Index defines rubber as cis-1,4-polyisoprene with a molecular weight varying from 100,000 to one million. Both natural and synthetic rubber is usually cross-linked with sulfur, peroxides or bisphenol. The process, called vulcanization, produces a three-dimensional lattice. It improves properties of the product which becomes much stronger, more temperature sensitive, more elastic and non-sticky.

While natural rubber is soluble in chloroform, absolute ether, many fixed and volatile oils, petroleum ether, carbon disulfide, and oil of turpentine, the cross-linked product is much less so. The synthetic varieties can derive from one or more of the following: 1,3-butadiene, chloroprene (2-chloro-1,3-butadiene), and similar monomers. The relevant copolymers often derive from styrene. Styrene-butadiene-rubber, or SBR, is the largest synthetic component of tires.

An estimated 60% of all manufactured rubber is used in tires. A typical passenger tire consists of natural rubber (14%), synthetic rubber (27%), carbon black (28%), steel (14-15%), and additives (fabric, fillers, accelerators, antiozonants, etc.) (16-17%). Its average waste weight is 20 lbs. A typical waste truck tire weights 100 lbs and contains reverse proportions of synthetic and natural rubber as compared with a car tire.

Waste tires are not biodegradable, thereby creating both an environmental and health problem. They exacerbate the spread of mosquito-borne diseases in that they provide an insect breeding ground. Additionally, whole tires are difficult to store in landfills in that they are bulky and cause damage to the landfill cap or seal, as they tend to "float" their way to the top of the fill. In an attempt to prevent this migration, many landfills require that scrap tires be shredded, a process which is energy intensive and wasteful if it does not produce any useful product. Due to the cost associated with proper disposal, many tires are dumped illegally.

In response to these problems, there are a number of known methodologies utilized to recycle used rubbers, all of which have significant limitations. Tires have been both combusted to produce energy and pyrolized to produce fuels. Pyrolysis is generally defined as thermal degradation at temperatures as high as 900 degree C. in an inert atmosphere and has been favored because lower temperature attempts to use tires as a source of energy have heretofore not been economic.

The breakage of rubber's covalent bonds requires that relatively large quantities of energy be delivered to the waste rubber material. Pyrolysis usually takes place at temperatures above 530 degrees C. All of these high-energy techniques use "dry" processing, in that the two reaction products are gas and solids. Some of the gas exhibits molecular weight high enough to condense with cooling water, useful as a valuable liquid fuel, but most is lower value gas and solid fuel.

Potentially economic and useful methodologies that have been attempted to introduce energy into rubber to break the covalent bonds are direct heating, ultra-sound, and microwave energy.

A single car waste tire weighing about 20 pounds has about the same heating value of coke, approximately 15,000 BTU's per pound, or approximately 258,000 BTU's per tire. Therefore, if economical, environmentally sound processes can be formulated to convert waste tires, fluff and other polymeric materials into a fuel source, much of the aforementioned problems can be obliviated. Accordingly, there is still a continuing need for improved methods of transforming tires, fluff and other polymeric materials into fuel. The present invention fulfills this need and further provides related advantages.

BRIEF SUMMARY OF THE INVENTION

The present invention provides an economic process which utilizes solvents such as biodiesel and other esters containing short alkyl groups, fats and oils, and relatively high molecular weight alkenes to produce liquid fuels from waste materials.

In a first embodiment, a process for using waste material to produce fuel comprises the steps of adding a predetermined quantity of waste material to a predetermined cycle starting solvent volume; introducing an energy source into the solvent for a predetermined time at a predetermined temperature and pressure to form a product; removing the energy source; optionally, recovering and removing at least some solvent from the product for use in a subsequent cycle; allowing the product to cool to a predetermined pumpable operative temperature; adding new solvent to achieve a predetermined subsequent cycle solvent starting volume; repeating the process using the predetermined subsequent cycle starting volume; and repeating the above for a predetermined number of cycles.

In a second embodiment, a process for using waste material to produce fuel comprises the steps of adding a predetermined quantity of waste material to a predetermined quantity of solvent; introducing an energy source into the solvent for a predetermined time at a predetermined temperature and pressure to form a product; removing the energy source; and allowing the product to cool to a predetermined pumpable operative temperature.

In a third embodiment, a process for recovering reusable solids, for example, steel, from polymeric material such as, for example, steel belted tires, comprises the steps of adding a predetermined quantity of polymeric material to a predetermined volume of solvent; adding an energy source into the solvent for a predetermined time at a predetermined temperature and pressure to allow the solid to separate from the tire; removing the energy source; and removing the separated solid from the solvent.

The present invention also encompasses the fuel formed by the processes described in detail below.

One advantage of the present invention is the economical utilization of waste materials and the economical removal of waste material from landfills.

A second advantage of the present invention is the reduction of the dependence on new fossil fuel sources.

Yet another advantage of the present invention is the reduction in the amount accumulated waste fats and oils such as those generated by food preparation due to their usage in the manufacture of solvent such as biodiesel.

A further advantage of the present invention is production of a relatively low cost fuel.

Yet another advantage is that tire steel and fluff fiber can be recycled economically, further enhancing the present invention's environmental benefits.

Still another advantage is that the process uses moderate temperatures and pressures, with concomitant energy savings and increased safety.

Other features and advantages of the present invention will be apparent from the following more detailed description of the preferred embodiments, taken in conjunction with the accompanying experiments which illustrate, by way of example, the principles of the invention.

DETAILED DESCRIPTION OF THE INVENTION

For purposes of this disclosure, the following definitions apply:

"waste material" is polymeric material and fluff.

"polymeric material" are macromolecular compounds comprising substantially of carbon and hydrogen plus a) smaller amounts of oxygen, for example polyesters, acrylates, and the like, b) nitrogen, for example polyurethanes, polyamides, and polyimides or c) sulfur, for example, vulcanized rubber. It includes for example, vulcanized and non-vulcanized rubber, polystyrene, polyacrylates, polymethacrylates, and polymers produced as a result of condensation polymerization such as for example, polyesters. Other such materials include, for example, polyamides such as nylons, polyolefins, and natural rubber, polyisoprene.

"fluff" is non-metallic materials, for example, plastic, vinyl, leather, cloth, sponge, foam such as polyurethane and polystyrene foams, glass, rubber, thermoplastic materials, thermosets, wood, paper, fabrics, glass, dirt, and tar. Fluff is often found among the content of automobiles and so called white goods, for example, refrigerators, washing machines, dryers, dishwashers and other similar products. However, for purposes of this specification, fluff is not meant to be limited to automobiles and white goods sources.

"biodiesel" is a mixture of methyl, ethyl, or n-propyl esters of carboxylic acids or combinations thereof formed as a result of transesterification of fats with methanol, ethanol, or n-propanol, respectively.

"polymeric material degradation" is any process that decreases the molecular mass of the polymer including devulcanization. More specifically, degradation comprises of breaking covalent bonds such as for example, carbon-carbon, carbon-sulfur, carbon-oxygen, and sulfur-sulfur bonds.

"degradation products" are materials that are of lower molecular weight or physical size than the starting polymeric materials. The decrease of the molecular weight or physical size is the result of the breaking of one or more covalent bonds of the macromolecular material. "Degradation products" include, but are not limited to, products formed as a result of for example, degradation of cross-links.

"solution", "suspension" and "dispersion" are used interchangeably.

"solvents" are:
 a. esters of carboxylic acid which exhibit sufficiently high boiling point to enable performing the reactions at temperatures necessary for the degradation and dissolution or dissolution of the polymeric material according to the present invention. While not required, the esters should preferably be liquids at ambient temperatures, for example, methyl, ethyl or n-propyl esters of long chain carboxylic acids, usually referred to as biodiesel; short alkyl chain (up to C-4) esters such as, for example, diethyl sebacate; and fats including waste fats, i.e. esters of glycerol and long chain carboxylic acid such as, for example, vegetable oil for example, corn oil and soy oil;
 b. 1-alkenes which exhibits sufficiently high boiling point to enable performing the reactions at temperatures necessary for the degradation and dissolution or dissolution of the polymeric material according to the present invention, for example, 1-octadecene; and
 c. mixtures of the above.

Although rubber waste tires and fluff are described as exemplars, the invention is neither limited to waste tires or rubber or fluff, but is contemplated to be used with waste materials, both organic and non-organic as defined above.

In a first step of a first embodiment of the present invention, waste material is introduced into a solvent. Optionally, the waste material is introduced incrementally as it dissolves/suspends/disperses. The process may be conducted by, for example, batch mode or by continuous sequential operation. Preferably, an amount to form between about 10% and about 35% solution by weight, most preferably, between about 15% and 20% solution by weight of polymeric material is introduced.

In a second step, energy, for example, ultra-sound, microwave energy, and preferably direct heat, is introduced into the solvent containing immersed waste material for a predetermined time sufficient to dissolve/suspend/disperse the degradation products to form a solution, suspension, dispersion or combinations thereof. It is not a requirement that all waste material be dissolved. In the preferred embodiments, process temperature is between about 180 degrees C. and about 400 degrees C.; preferably between about 310 degrees C. and about 325 degrees C.; and most preferably between about 320 degrees C. and about 325 degrees C. In the preferred embodiments, the process is carried out at atmospheric pressure, which provides both economic and safety advantages. However, the process is not limited to atmospheric pressure.

Optionally, the waste material may be machined or otherwise formed into small pieces prior to immersion in the liquid. Small waste material size is not a requirement, as the surface area of waste material in contact with the liquid does not determine the time of the process, but rather, we believe process time is determined by the ability of solvent to penetrate the waste material. Solvent penetration occurs more freely upon energy introduction and optional agitation.

Low boiling distillates, for example, distillates having a boiling point up to about 100 degrees C., may be distilled off. Due to relatively low process temperatures, the process of the present invention does not produce significant quantities of gas. Those gases that are formed are flammable and constitute an additional small energy by-product of the process. The distillates consist usually of two phases—one aqueous, the other organic.

In a third step, the energy source is removed and metal remnants, if present, are removed from the solution/suspension/dispersion, hereinafter referred to as the "product". The present invention produces metal better suited for recycling in that the metal separates early in the process. The metal can thereafter be recovered using, for example, physical removal such as through the use of magnets, tongs, forceps, strainer and the like.

Other material for example, carbon black, and small quantities of zinc oxide, silica, and calcium carbonate are optionally removed. Depending on final product usage, none, some, or all of the other material is removed. The removal process may be by, for example, filtering, siphoning, and centrifugation. Once removed, the other material may be recycled through known recycling methods.

In a fourth step, the solvent is recovered from the product, for example, by distillation, and reused to dissolve/suspend/disperse additional polymeric material for a predetermined number of cycles. Optionally, a predetermined amount of new solvent may be added to the used solvent recovered from the prior cycle to achieve a predetermined cycle starting volume.

In a fifth step, the product is cooled to an effective safe temperature for transportation for use as, for example, fuel. Total homogenization is not required, but the product should be pumpable at predetermined operative temperatures. The product is non-grindable, that is, after cooling, the product is not capable of being ground into a powder.

In a first step of a second preferred embodiment of the present invention, waste material is introduced into a liquid. Preferably, an amount to form between about 30% and about 90% solution by weight, most preferably, about 60% solution by weight of waste material is introduced. In all other aspects, steps one through three are as described above.

In a fourth step, the product is cooled to an effective safe temperature for transportation for use as, for example, fuel. Total homogenization is not required, but the product should be pumpable at predetermined operative temperatures. The product is non-grindable, that is, after cooling, the product is not capable of being ground into a powder.

In a fifth, optional step, the product is further refined using known methods to produce multiple categories of known fuel, for example, home heating fuel, automobile fuel, aviation fuel, and the like.

The following experiments were conducted utilizing differing preselected solvents: A sample of such a mass as to produce a solution of about 10-50% w/w of tire was cut to pieces not larger than about 1 inch and introduced into a three neck reactor (for 250, 500 or 1000 ml) filled with a predetermined quantity of solvent and an optional selected additive of about 0-0.5%. The first neck was used to constantly mix the reactor content using a mechanical stirrer, the second neck enabled constant measurements of the temperature of the reactor content with a thermocouple, and the third neck was connected to a Liebig's condenser to constantly distill off low boiling products, if formed. The mixture was heated to a predetermined temperature for a predetermined period of time.

As the reaction progressed, the pieces of tire disappeared and the mixture became black. The reactor was allowed to cool and when the mixture's temperature fell to below about 140 degrees C. its content was poured through a mesh strainer. In all cases steel remnants were easily removed and simply cleaned with no rubber residue remaining on the steel. This occurred even in low temperature experiments down to about 180 degrees C.

Selected samples of the distillate as well as the filtrate were analyzed using GC/MS. The filtrate was obtained by either passing the product through a paper filter under both normal and decreased pressure or by centrifugation to separate the carbon black and other inorganic material from the solution/suspension/dispersion.

The following is a summary of experimental findings. While the exemplars were conducted at atmospheric pressure, the present invention is not limited to atmospheric pressure.

The following liquids were utilized as solvents: waste cooking oil, vegetable oil, diesel oil, paraffin, 1-octadecene, biodiesel, dibenzyl sebacate, dibutyl phthalate, tetraethylene glycol, and diethyl sebacate.

Soybean oil produced highly encouraging results, particularly when known devulcanizer additives such as ditolyl disulfide or zinc oxide and stearic acid were added. A substantially total solubilization of the mix required about 3 hours of heating at about 316 degrees C. to about 343 degrees C., with the latter being preferable.

Diesel oil having a boiling point of about 150 degrees C. to about 370 degrees C., with 90% above 204 degrees C. proved to be unacceptable. Paraffin also proved to be unacceptable because its waxy or solid character at ambient temperature made processing very difficult. Dibutyl phthalate processed at about 2 hours at about 290 degrees C. produced practically no degradation of rubber.

Dibenzyl sebacate and tetramethylene glycol (together with p-tolyl disulfide (PTDS)) heated with tire rubber to about 260 degrees C. also produced practically no dissolution of rubber in the medium.

1-octadecene produced results better than those achieved with vegetable oil, producing total solubilization of the tire in about 60 minutes at about 300 degrees C. using PTDS as an additive. Equal results were accomplished when employing a mixture of vegetable (soy) oil and 1-octadecene.

However, vegetable oil batches often overheated and scorched the rubber and the equipment. Consequently, a solvent with a lower boiling point was sought so that the temperature could be controlled by refluxing the mixture at the solvent's atmospheric boiling point. Biodiesel was chosen due to its reasonable price, relatively low boiling point, and acceptable viscosity even at ambient temperatures. The results were unexpected. Homogenization of the mix was achieved significantly faster than when other media were used. Due to the significant rate of biodiesel decomposition in the presence of tire rubber at reflux, the process was performed below the boiling point of biodiesel.

The effective temperatures were found to be between about 260 and about 345 degrees C. At higher temperatures the process required even less time but the rate of biodiesel degradation became a significant factor. The optimal temperature of the process is about 325 degrees C. at which disintegration of the tire rubber required about 30 minutes.

At temperatures higher than 325 degrees C. the biodiesel degradation in the presence of rubber became significant. It was even more the case when the biodiesel was refluxed above about 347 degrees C. Additives, including those helpful as devulcanizing agents, did not significantly improve the process's temperature or time. The process was conducted at tire concentrations varying from about 10% to more than about 50%. At concentrations higher than about 50% the product after standard process time still contained small rubber chunks which were soft and close to total disintegration.

The result was duplicated with diethyl sebacate heated to its boiling point of 312 degrees C. for about 30 minutes proving the process can be performed with other esters containing short alkyl chains.

Mixtures exposed to temperatures below about 290 degrees C. were difficult to filter or separate using a centrifuge. Liquefied products exposed to higher temperatures could be easily filtered to produce a black solid consisting primarily of carbon black. Thus, one advantage of bio-diesel is that the resulting mixture can be filtered and centrifuged to separate the solids from the liquid.

The filtered liquid without the solid material was analyzed using the GC/MS. Besides the products that were not sufficiently volatile to pass through the specific GC column kept at 300 degrees C., it contained three major peaks (MW=270, MW=296, and MW=298). They correspond to methyl palmitate ($C_{15}H_{31}COOCH_3$), methyl oleate ($CH_3(CH_2)_7CH=CH(CH_2)_7COOCH_3$), and methyl stearate ($C_{17}H_{35}COOCH_3$), respectively, which are typical components of biodiesel deriving from the soy oil.

When performing the process with biodiesel, low boiling products up to about 100 degrees C. were distilled off and collected. Usually, a few grams of a distillate were collected which consisted of two phases. The oil-phase distillate contained several peaks in the MS. They included molecular masses of 126 and 136. The exact structure of the corresponding compounds could not be determined. It is believed that initially the methyl or methoxyl group of the biodiesel reacts with the vulcanized rubber. For example, the methyl group reacts with the sulfur atoms to form a thiomethyl functionality. In all reactions above about 290 degrees C., there was some evolution of gas, with higher temperature and higher concentration of tire rubber producing more gas. The mass of the released gas was not significant and on every occasion it was tested it proved to be flammable.

The product of the treatment of tire rubber with biodiesel was analyzed for its BTU/lb value. The results for the mixture consisting of about 48% tire rubber (without steel) and about 52% biodiesel are listed in Table 1.

TABLE 1

| ASTM Method | Test | Result | Units |
|---|---|---|---|
| D4052 | Density @ 60 | 1.0304 | g/ml |
| D240 | Gross Heat of Combustion | 17048 | BTU/lb |
| D240 | Gross Heat of Combustion | 146442 | BTU/gal |
| D4294 | Sulfur | 0.414 | Wt % |
| D93 method B | Flash Point (PMCC) | 179.7 | deg F. |
| D445 at 100 deg C. | Kinematic Viscosity @ 100 | 787.4 | cSt |
| D482 | Ash @ 775 deg C. | 2.040 | Wt % |
| D95 | Water by Distillation | <0.05 | Vol % |
| D95 + D473 | Total Water & Sediment | 4.40 | Vol % |
| D473 | Sediment by Extraction | 4.40 | Vol % |

Although the mechanism of action of the methyl esters is not known for certain, we believe that initially there is a reaction involving rubber and the methyl ester (ethyl ester in the case of diethyl sebacate). The result of this reaction is some low boiling products (vide MS) containing O—$CH_3$ or S—$CH_3$. Simultaneously, the degradation of rubber is believed to be initiated.

The original size of carbon black particles used in tire manufacture is below 50 nm. Since the filtration is successful even at high concentrations of rubber (up to at least 30% w/w) we believe that during the rubber degradation the carbon black particles must form agglomerates. Alternatively, they may have formed upon rubber production. Otherwise, as stated above, they could not be separated using simple filtration or centrifugation since the initial size of carbon black particles in tires is much below 50 nanometers.

In most experiments a mixture of old and new tires from various sources deriving from cars and trucks were used.

The organic components of rubber include the benzene ring and a variety of aliphatic chains that may or may not comprise of double bonds. Thus, the mechanisms of potentially bond breaking/forming processes are: electrophilic aromatic substitution, electrophilic addition to double bonds and a plurality of free radical processes. Additionally, the presence of sulfur atoms in the system offers a nucleophilic center for a nucleophilic attack.

In line with these possibilities, additives tried include the following reactants: tert-nonyl polysulfide, 2-mercaptobenzothiazol, dibenzyl disulfide, bis(4-methoxyphenyl) disulfide; p-tolyl disulfide (PTDS); elemental sulfur; zinc dust; iron powder; Fenton reagent (formed in situ, for example, from iron (II) acetylacetonate and oxidizing agents); 2,3-dimethyl-2,3-diphenylbutadiene (thermally stable free radical initiator), and stearic acid and zinc oxide in various proportions; zinc bromide and 2,5-dimethoxybenzyl bromide, zinc bromide and trityl chloride, zinc bromide (purchased and formed in situ) and 2-phenylbenzyl bromide, zinc chloride and trityl chloride, and tin (IV) diacetoacetonate dichloride and dimethoxybenzyl bromide. Some of these additives, particularly those capable of electrophilic addition to double bonds, enabled shortening of the procedure. However, none of the tried additives decreased significantly the time required for the tires' degradation. The free radical initiators were not effective because, we believe, the carbon black acted as a scavenger of free radicals.

In one comparative experiment, car tire pieces (15.0 g) of the same origin were cut to small chunks (about 10 mm in diameter, about 65 pieces) and to substantially larger chunks (about 2.5 cm in diameter, 7 pieces), and separately immersed in 105.0 g of 100% biodiesel in a three neck 500 ml reactor and mechanically mixed and heated to about 300 degrees C. for about 30 minutes. The temperature in both experiments was strictly kept the same. After the mixtures had been cooled to about 150 degrees C. they were poured through a strainer. The degree of tire degradation was compared in both experiments. It was found that the degree of tire degradation did not differ. This indicates that the reaction time practically does not depend on the size of the rubber particles. It further indicates that the reaction is not limited only to the surface of the rubber material.

Polymerization of 1,3-butadiene or isoprene (methylbutadiene) produces a polymer with double bonds present between (previous) carbon atoms number 2 and 3. Natural or synthetic rubber is such a polymer which is known to be soluble in some organic solvents, including biodiesel. In comparison, vulcanization produces connections between the former double bonds of various rubber chains, formed by one or more sulfur atoms. Vulcanization (and any other cross-linking process) forms a three dimensional network. The molecular weight is close to infinity, and therefore, the cross-linked material is insoluble in solvents. It is believed that the novel process of the present invention achieves at least some extent of devulcanization, thereby forming a product that is thereafter soluble. Many non-vulcanized polymers when heated become amorphous and soluble in the solvent. In small concentrations when the solvent is cooled, they remain dispersed or dissolved in the mixture and become part of the pumpable fuel.

In preferred embodiments, biodiesel was used as the solvent. Interestingly, no degradation of biodiesel at its boiling point without tire rubber (a blank experiment) has been observed.

While the above exemplars referenced waste tires, the present invention is also applicable to fluff as the waste material. The composition of fluff can vary dramatically from one sample to another, however, it usually contains, for example, plastics, rubber, thermoplastic materials, thermosets, polyurethane and polystyrene foams, wood, paper, fabrics, glass, dirt, metal pieces, and tar. Additionally, fluff may be contaminated with such liquids as antifreeze, gasoline, engine oil, brake fluid, windshield washing fluid, and refrigerants such as freons, and on rare occasions PCBs (perchlorobenzenes). Furthermore, fluff contains varying quantities of moisture and occasionally, small amounts of such heavy metals as lead and cadmium.

In the following exemplar, the composition of the plastics portion of fluff is approximately:

| Polymeric material | Percent |
|---|---|
| Polyurethane foam | 23 |
| RP, BMC, SMC | 22 |
| Polypropylene | 19 |
| PVC | 15 |
| ABS | 7 |
| Nylons | 4 |
| Acrylic | 3 |
| Phenolic | 2 |
| Other | 5 |

Where SMC = sheet molding compounds; BMC = bulk molding compounds; RP = fiber or self reinforced polymers; and PVC = polyvinyl chloride.

In a preferred embodiment, during a first, optional, step, the fluff is pretreated using known methods to a) separate components of very low or very high density, for example, by floating the fluff in liquids with various densities, and/or b) to remove left-over ferrous metals. For purposes of this disclosure, very low density is meant to be below 0.95 g/cc and very high density is meant to be above 1.03 g/cc.

In a second step, the fluff is immersed in solvent, for example, biodiesel, waste cooking oil, or unused cooking oil. To promote trans-esterification which depolymerizes condensation polymerization products such as polyethylene terephthalate (PET), compounds such as primary or secondary amines, alcohols, phenols, carboxylic or sulfonic acids exhibiting an operative boiling point can optionally be added to the mixture. Such compounds may promote also the degradation of polyimides, poly(amino acids) and other similar macromolecules.

In a third step, the mixture is agitated, for example, vigorously mechanically stirred, and heated under reflux to about 260 to about 315 degrees C. Outcoming gases, for example, hydrogen chloride and hydrogen sulfide, may optionally be scrubbed into the solution of a base such as, for example, sodium hydroxide or sodium carbonate. The mix is kept during constant stirring at the preselected temperature for about 60 minutes.

Fluff may also contain halogenated compounds which may require additional, optional scrubbers. For example, if the fluff contains poly(vinyl chloride), the chlorine atoms form hydrogen chloride than can optionally be scrubbed in a basic solution, for example, hydroxide or carbonate solution. If needed, additional scrubbers, for example an acidic solution capable of scrubbing low boiling amines can be optionally added. Therefore, one or more scrubbers, as needed are optionally utilized.

In a fourth step, the mixture is cooled down to about 150 degrees C. or less and then filtered to remove any non-dissolved solids. It has been found that the major components of these solids are reusable fibers.

The resulting filtered liquid is combustible, usable as a fuel. Optionally, the filtered liquid can be distilled to remove lower boiling hydrocarbons and diols.

Optionally, the addition of small amounts, for example about 0.1 to about 3.0% w/w against the fluff of compounds such as, for example, nonylphenol, n-octylamine, or glycerol shortens the time necessary to produce an effective homogeneous mixture.

In one experiment, 22.3 gram of a typical fluff sample collected from a junkyard was added to 120.0 gram of used oil from a pizza restaurant placed in a 1 L, three neck glass reactor equipped with a mechanical stirrer, reflux condenser and a thermocouple to measure the temperature of the reaction mixture. The exhaust gases from the condenser were scrubbed into an aqueous solution of sodium hydroxide. The mixture was stirred and heated using an electric heating mantle to a temperature of about 315 degrees C. The mixture was kept at this temperature for about 60 minutes. Next, the mixture was cooled to about 260 degrees C. and an additional 19.9 grams of fluff was added to the mix. The mix was kept at about 315 degrees C. for about 60 minutes. The resulting viscous liquid was cooled to 204 degrees C. and passed through a strainer. The process produced about 20 grams of solids (fiber) which remained on the strainer and about 135 grams of viscous, flammable liquid which solidified when cooled to ambient room temperature. Additionally, about 3 to about 5 grams of water were collected.

In a second experiment, similar results were achieved when biodiesel was substituted for the used cooking oil. Biodiesel was found to allow more fluff to be added to the mixture before the mixture became ineffectively viscous.

Although the present invention has been described in connection with specific examples and embodiments, those skilled in the art will recognize that the present invention is capable of other variations and modifications within its scope. These examples and embodiments are intended as typical of, rather than in any way limiting on, the scope of the present invention as presented in the appended claims.

What is claimed is:

1. A fuel source producing process comprising the steps of:
   a. adding a waste material to a solvent;
   b. introducing an energy source into the solvent;
   c. removing the energy source;
   d. distilling off distillates having a boiling point up to about 100 degrees C.; and
   e. allowing the solvent and a degraded waste material to cool, thereby producing a non-grindable fuel source, the fuel source comprising solvent and the degraded waste material.

2. The fuel source of claim 1 wherein the solvent comprises a solvent selected from the group consisting of a short alkyl chain ester; a 1-alkene and mixtures thereof.

3. The process of claim 1 wherein the quantity of waste material introduced forms about 30% to about 90% solution by weight and the energy source creates a process temperature between about 180 degrees C. and about 400 degrees C.

4. The process of claim 1 wherein the waste material comprises waste tire.

5. The process of claim 1 wherein the waste material comprises fluff.

6. The process of claim 5 further comprising the step of adding to a starting solvent volume about 0.1 to about 3.0% w/w against the fluff of compound selected from the group consisting of phenols, alcohols, and amines.

7. The process of claim 6 wherein the compound is a compound selected from the group consisting of nonylphenol, n-octylamine, and glycerol.

8. The process of claim 1 wherein the solvent comprises biodiesel.

9. The process of claim 1 wherein the solvent comprises short alkyl chain esters.

10. The process of claim 1 wherein the solvent comprises fats.

11. The process of claim 1 wherein the solvent comprises a 1-alkene.

12. The process of claim 1 further comprising the step of removing at least some material from the solvent and degraded waste material.

13. The process of claim 1 wherein the at least some material is steel.

14. A fuel source producing process comprising the steps of:
   a. adding waste material to a first batch of solvent;
   b. introducing an energy source into the solvent;
   c. removing the energy source;
   d. allowing the solvent and a degraded waste material to cool, thereby producing a non-grindable fuel source, the fuel source comprising solvent and the degraded waste material;
   e. recovering and removing some, but not all, solvent from the solvent and degraded waste material;
   f. removing the fuel source;
   g. adding a second batch of solvent to the recovered, removed solvent to achieve a second batch of solvent;
   h. using the second batch of solvent to repeat steps a through h for at least one cycle.

15. The process of claim 14 wherein the some solvent is recovered from the product through distillation.

16. The process of claim 14 wherein the quantity of waste material introduced forms about 10% to about 35% solution by weight.

17. The process of claim 14 wherein the quantity of waste material introduced forms about 30% to about 90% solution by weight.

18. The process of claim 14 wherein the energy source creates a process temperature between about 180 degrees C. and about 400 degrees C.

19. The process of claim 14 wherein the solvent comprises biodiesel.

20. The process of claim 14 further comprising the step of removing at least some material from the solvent and degraded waste material.

21. The process of claim 20 wherein the at least some material is steel.

22. The process of claim 14 wherein the waste material comprises waste tire.

23. The process of claim 14 wherein the waste material comprises fluff.

24. The process of claim 14 further comprising the step of refining the fuel source using known refining methods.

25. A fuel source producing process comprising the steps of:
   a. adding a waste material comprising fluff to a solvent;
   b. introducing an energy source into the solvent;
   c. removing the energy source; and
   d. allowing the solvent and a degraded waste material to cool, thereby producing a non-grindable fuel source, the fuel source comprising solvent and the degraded waste material.

26. The process of claim 25 further comprising the step of adding to a starting solvent volume about 0.1 to about 3.0% w/w against the fluff of compound selected from the group consisting of phenols, alcohols, and amines.

27. The process of claim 26 wherein the compound is a compound selected from the group consisting of nonylphenol, n-octylamine, and glycerol.

* * * * *